Patented June 23, 1936

2,044,959

UNITED STATES PATENT OFFICE 2,044,959

COMBINED FUNGICIDAL AND INSECTICIDAL SPRAY MATERIALS

Wendell H. Tisdale, Wilmington, Del., and Louis S. Bake, Pennsgrove, N. J., assignors to E. I. du Pont de Nemours & Company, Wilmington, Del., a corporation of Delaware No Drawing. Application September 2, 1932, Serial No. 631,500

13 Claims. (Cl. 167—43)

This invention relates to combined fungicidal and insecticidal materials and particularly to oil emulsions adapted for spraying plants infested with fungi and scale insects.

For many years there has been a recognized need for more effective combined fungicide and insecticide spray materials. This is especially true of material for sprays for use on citrus trees where scale insects and parasitic fungi are active all year round. Many materials have been proposed for this purpose but have not proved to be entirely satisfactory. Some of these spray materials which have been employed up to the present time and particularly the oil emulsion sprays tend to injure the foliage of growing plants; some carry insoluble particles which break the oil film and reduce the effectiveness of the oil on the scale insects; some fail to control one or more of the parasites; and some frequently permit the growth of one or more of the parasites to become more rapid after use than before. This latter disadvantage is particularly true of the copper and oil sprays as the copper salts remain on the leaves of the plant for a long period of time after application and prevent the recurrence and spread of the so-called "friendly" fungi but have no effect on the scale insects. Accordingly the recurrence in growth of scale insects after the application of such copper and oil sprays is usually much greater than before such treatment.

The sulfur and oil sprays have also been used with some degree of success but on the whole have proved unsatisfactory due to injury caused to the plant or lack of control of one or more of the parasites.

An object of our invention is to provide new and more effective compositions of matter which are adapted to be used for spraying citrus trees and other plants. Further objects are to provide spray materials of the above type which have a less tendency to injure the foliage of growing plants, carry no insoluble particles to break the oil film, exert a high degree of control upon both the scale and parasitic fungi, and do not prevent the spread and multiplication of the friendly fungi. A still further object is to provide a new process of treating plants infested with parasitic fungi and scale insects. Other objects are to provide new compositions of matter and to advance the art. Still other objects will appear hereinafter.

These objects may be accomplished in accordance with our invention which comprises spraying infested plants with water containing a composition of matter having combined insecticidal and fungicidal properties, composed of a stable oil or oils, a penetrating and solvent agent, and a mercury compound having fungicidal properties and which is soluble in at least one of the constituents of the spray material. The use of emulsified oils for the control of scale insects is well known. Also the use of mercury compounds for the control of bacterial and fungus diseases is established.

Our invention is based upon the discovery that the insecticidal properties of oils are augmented by the presence of mercury compounds. The mercury compounds, when employed in these oil mixtures, are more effective for our purpose than when employed in any other spray combination heretofore known. These oil-mercury combinations are especially suited to the control of scale insects and fungus diseases of citrus trees although they may be used on other plants.

In carrying out our invention the oil or combination of oils employed are of sufficient purity to be non-injurious to the plants when used in the desired concentration for spraying. Oils of sufficiently low viscosity to spread and penetrate well and at the same time volatilize within a reasonable time after application are preferred. It is known that emulsified oils, having a viscosity below 80° Saybolt tend to penetrate the leaf tissue and cause injury (Guinsburg—Jour. Agr. Res. vol. 43 No. 5, 1931). Oils having a viscosity above 100° Saybolt are likely to cause injury by producing a smothering effect and are not as effective in the control of scale as oils having a lower viscosity. Accordingly, we prefer to employ oils having a viscosity between 80–100° Saybolt, although we consider as coming within our invention oils of higher or lower viscosity. The proper viscosity may be obtained by mixing one or more oils of different viscosity. Some of the paraffin oils are well suited for this purpose.

In order to make the oil or oils more effective in killing scale insects we contemplate employing penetrating or solvent agents with the oils. Such solvent or penetrating agents should be compatible with the oil and mercury compounds and harmless to plants in the strengths employed. Among the penetrating and solvent agents which we have found to be particularly satisfactory for our purpose are pine oil, mono-ethyl ether of ethylene glycol, b-b-dichloro-diethyl-ether. However, our invention is not to be limited to the use of these particular penetrating and solvent agents as many similar materials may be employed to advantage in such sprays.

The mercury compounds which we have found to be most satisfactory for our purpose and which constitute the preferred form of our invention are the organic mercury compounds which are soluble in oil and which have fungicidal and bactericidal properties. Some of these organic mercury compounds which we have found to be particularly satisfactory are ethyl-mercury-chloride and some of the oil soluble hydrocarbon mercury salts disclosed in a copending application, Serial No. 625,526, filed on or about July 28, 1932, Patent No. 1,993,776. These oil soluble mercury compounds may be added as such to the oil or may be prepared by reacting the ingredients in the oil. They are carried in the oil when the mixture is emulsified and are spread on the foliage and held in place by the oil. While the oil soluble mercury compounds are preferred, we have also found that oil insoluble mercury salts may be employed so long as such mercury salts or compounds are soluble in at least one of the other constituents of the spray. While the oil insoluble mercury compounds which are soluble in one of the other constituents of the spray may be employed generally, we preferably employ the less volatile compounds under such conditions. Among the oil insoluble mercury compounds which we have found to be particularly satisfactory for our purpose are ethyl-mercury-phosphate and ethyl-mercury-arsenate which are water soluble in the presence of an alkali and thus can be introduced into the emulsion by mixing with an alkaline emulsifying agent which is dissolved in the water before adding the oil.

Our oil-mercury combinations may be emulsified by any of the commonly accepted methods employed for emulsifying oils. The emulsion may be made in concentrated form and later diluted for application, or the emulsion may be made in the final dilution at the time of application. For this purpose, the emulsifying agent may be added to the oil in advance, if soluble, or added when the emulsion is prepared.

In order to more fully illustrate our invention and the preferred mode of carrying the same into effect, the following examples are given of various compositions and methods of making the same, which may be diluted so as to contain from about 0.5-2% of oil to be employed for spraying purposes:

*Example 1.*—6.85 grams of HgCl$_2$ and 4.2 grams of lead tetraethyl were added to ½ gallon of a mixture of 90% transformer oil and 10% pine oil and the mixture warmed until the reaction was complete. The lead diethyl dichloride formed in the reaction was filtered off and 136 grams of oleic acid was added to the filtrate containing the ethyl mercury chloride in solution, which was then emulsified with ½ gallon of water containing 58 grams of triethanolamine.

This emulsion, when diluted in water to contain 1% of oil, was found to be very effective in the control of red scale, purple scale, scab (Sphaceloma), and Melanose (*Phomopsis citri*) of citrus trees. It was likewise found effective in the control of blue stain or sap stain of lumber.

The oleic acid and triethanolamine operate primarily as emulsifying agents.

*Example 2.*—74.4 grams of mercuric chloride and 46.0 grams of lead tetra ethyl were added to 20 pounds of a mixture of 48% of 65° paraffin oil, 48% 110° paraffin oil, and 4% pine oil and heated until the reaction was complete. The lead diethyl dichloride formed in the reaction was filtered off and 3¼ pounds of oleic acid were added to the filtrate, containing the ethyl mercury chloride in solution, which was then diluted to 40 pounds with the paraffin oils and pine oil in the above mentioned proportions. This oil is now ready for emulsification with the desired quantity of water containing from 100-150 grams of sodium resinate per gallon of oil to be emulsified. Soda ash itself may be substituted for the sodium resinate. This emulsion gave essentially the same result as Example 1. The sodium resinate functions as an emulsifying and spreading agent and the oleic acid aids in the emulsification.

*Example 3.*—100 grams of a mixture of 48% of 65° paraffin oil, 48% of 110° paraffin oil and 4% pine oil, containing 0.4% of ethyl mercury chloride, prepared in a manner similar to the procedure stated in Example 1, i. e. by formation of the ethyl mercury chloride in the oil by reacting the ingredients therein and then separation of the lead diethyl dichloride, was diluted with 5 grams of butyl ammonium oleate as an emulsifying agent. The resulting oil is very rapidly emulsified by adding any desired amount to water and agitating.

*Example 4.*—A composition, similar to that of Example 2, was prepared by substituting the monoethyl-ether of ethylene glycol for the pine oil, otherwise employing the ingredients and process of Example 2.

*Example 5.*—A composition, similar to that of Example 2, was prepared by substituting b-b-dichloro-diethyl-ether for the pine oil of Example 2, otherwise proceeding substantially as described in Example 2.

*Example 6.*—A concentrated solution of ethyl mercury oleate was prepared as follows:

111.0 grams of mercuric oxide, 375 cc. of oleic acid, and 81 grams of lead tetra ethyl were added to 500 cc. of 65° paraffin oil, the mixture heated until the reaction was complete and then diluted to 2250 cc. with 65° paraffin oil.

840 cc. of the above concentrate was diluted with 660 cc. pine oil, 6280 cc. of 110° paraffin oil, 5460 cc. of 65° paraffin oil and 4410 cc. of oleic acid. This oil can be readily emulsified by mixing 1 gallon with, say, 72 gallons of water containing 120 grams of sodium resinate (described in Example 2) or an approximate equivalent amount of sodium carbonate.

*Example 7.*—The procedure of Example 6 was followed except that stearic acid was substituted for the oleic acid of such example, thereby producing an emulsion containing ethyl mercury stearate.

*Example 8.*—An emulsion containing ethyl mercury palmitate was prepared by following the process of Example 6 but substituting the molecular equivalent of palmitic acid for the oleic acid of Example 6.

*Example 9.*—2315 grams of soda ash, 107.5 grams of mercuric chloride and 35 grams of lead tetra ethyl were introduced into a ball mill and milled until the reaction between the mercuric chloride and lead tetra ethyl was complete. The spray emulsion was made by dissolving the required amount of the mixture in water and emulsifying with any desired oil or mixture of oils, containing an amount of oleic acid sufficient to combine with a large proportion of the soda ash but insufficient in amount to combine with all of the soda ash, leaving the emulsion slightly alkaline in reaction.

*Example 10.*—1000 grams of sodium sulfate, 111.7 grams of mercuric chloride, 75.8 grams of phosphoric acid and 91.8 grams of lead tetra ethyl were added to a ball mill and the mixture milled until the reaction was complete. This reaction formed ethyl mercury phosphate. The sodium sulfate effectively prevents caking of the phosphate. When the reaction was complete, 2000 grams of soda ash were added and mixed thoroughly by continuing the milling operation. The spray emulsion was formed by dissolving in water and emulsifying with an oil containing oleic acid as in Example 9.

Example 11.—160 grams mercuric oxide, 136 grams lead tetra ethyl, 197 grams arsenic acid, and 500 grams of sodium sulfate were added to a ball mill and milled until the formation of ethyl mercuric arsenate was complete. 2500 grams of soda ash were then added to the mill and milling continued to cause the ingredients to become thoroughly mixed. The spray emulsion may be formed in substantially the same manner as in Examples 9 and 10.

Many other mercury compounds may be substituted for those specifically mentioned hereinabove and some of those, which we have found to be particularly effective, correspond to the general formula:

R—Hg—X in which R is an unsubstituted hydrocarbon radical and X an acid radical. Some of the compounds falling within this group, in addition to those mentioned above, are phenyl mercury acetate, ethyl mercury acetate, ethyl mercury cyanide, propyl mercuric oxalate and others referred to in the copending application No. 453,099 of M. S. Kharasch, filed on or about May 16, 1930 and Patent No. 1,770,886, granted to Kharasch. Numerous other mercury compounds having fungicidal properties can also be employed, some of which are soluble in the oil, some are insoluble in the oil but soluble in water with alkali and others are soluble in the solvent or penetrating agents. Many of these compounds have the formula:

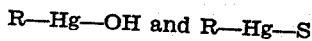
R—Hg—OH and R—Hg—S in which R is an unsubstituted hydrocarbon as described in the Kharasch applications No. 455,963, filed on or about May 26, 1930 and No. 276,189, filed on or about May 8, 1928, respectively; mercury salts of monoamines described in Kharasch application No. 408,676, filed on or about November 20, 1929; mercury compounds of aliphatic hydrocarbons, described in Kharasch patent 1,820,001; mercury chlor—or nitrophenolic compounds or inorganic mercury compounds such as mercuric or mercurous chloride, mercuric sulfate, mercuric oxide or simple organic salts such as mercuric acetate or oxalate.

Our combined sprays comprising oil, a penetrating and solvent agent, an emulsifying agent, and a mercury compound having fungicidal properties and which is soluble in at least one of the constituents of the emulsion has the following advantages over combined sprays such as have been employed up to the present time—(1) they have a less tendency to injure the foliage of growing plants; (2) the penetrating or solvent agents aid in dissolving and penetrating the wax coating of the scale insects thus rendering the oils and mercury salts more effective; (3) the emulsions carrying the mercury compounds, in addition to being effective fungicides and bactericides carry no insoluble particles to break the oil film and reduce its effectiveness on scale insects; (4) our oil mercury sprays enable a high degree of control of both scale and parasitic fungi to be obtained, destroying most of the scale insects but do not prevent the recurrence of the friendly fungi. Both the oil and mercury compounds slowly volatilize enabling the friendly fungi to recur and spread rapidly over plants, parasitizing such scale insects as remain and thereby preventing the spread and multiplication of scale. For this reason the oil-mercury combination is more satisfactory than the copper combinations heretofore employed. The copper salts have a tendency to remain on the leaves of the plant for a long time after application thereby preventing the recurrence and spread of the so-called friendly fungi.

While we have disclosed compositions composed of particular substances in specific amounts, it will be understood by those skilled in the art that many variations and modifications in the substances and proportions employed may be made without departing from the spirit of our invention. Accordingly the scope of our invention is to be limited solely by the appended claims construed as broadly as is permissible in view of the prior art.

We claim:

1. A composition of matter suitable for use as an insecticide and fungicide which comprises an oil emulsion containing a mercury compound having fungicidal properties and which compound is soluble in at least one of the constituents of the emulsion.

2. A composition of matter suitable for use as an insecticide and fungicide which comprises an emulsion of a stable oil, a penetrating and solvent agent, water, an emulsifying agent, and a mercury compound having fungicidal properties, said compound being soluble in at least one of the constituents of the emulsion.

3. A composition of matter suitable for use as an insecticide and fungicide which comprises an emulsion of a stable oil, a penetrating and solvent agent, water, an alkaline emulsifying agent, and a mercury compound having fungicidal properties, said compound being soluble in at least one of the constituents of the emulsion.

4. A composition of matter suitable for use as an insecticide and fungicide which comprises an emulsion of an oil having a viscosity of about 80–100° Saybolt and a mercury compound having fungicidal properties, said compound being soluble in at least one of the constituents of the emulsion.

5. A composition of matter suitable for use as an insecticide and fungicide which comprises an oil emulsion containing a mercury compound having fungicidal properties and which compound is soluble in the oil.

6. A composition of matter suitable for use as an insecticide and fungicide which comprises an emulsion of a stable oil, a penetrating and solvent agent, water, an emulsifying agent, and a mercury compound having fungicidal properties, said compound being soluble in the oil.

7. A composition of matter suitable for use as an insecticide and fungicide which comprises an emulsion of a stable oil, a penetrating and solvent agent, water, an alkaline emulsifying agent, and a mercury compound having fungicidal properties, said compound being soluble in the oil.

8. A composition of matter suitable for use as an insecticide and fungicide which comprises an emulsion of an oil having a viscosity of about 80–100° Saybolt, and a mercury compound having fungicidal properties, said compound being soluble in the oil.

9. A composition of matter suitable for use as an insecticide and fungicide which comprises an oil emulsion containing a compound having the formula:

R—Hg—X wherein R represents an unsubstituted hydrocarbon radical and X represents an acid radical.

10. A composition of matter suitable for use as an insecticide and fungicide which comprises an oil emulsion containing ethyl mercury oleate.

11. A composition of matter suitable for use as an insecticide and fungicide which comprises an oil emulsion containing a compound having the formula:

R—Hg—X wherein R represents an unsubstituted hydrocarbon radical and X represents a radical of a fatty acid.

12. A composition of matter suitable for use as an insecticide and fungicide which comprises an oil emulsion containing ethyl mercury stearate.

13. A composition of matter suitable for use as an insecticide and fungicide which comprises an oil emulsion containing ethyl mercury palmitate.

WENDELL H. TISDALE.
LOUIS S. BAKE.